United States Patent

Apple, Jr. et al.

[11] Patent Number: 5,420,899
[45] Date of Patent: May 30, 1995

[54] GRAPPLE FOR A FUEL BUNDLE CHANNEL

[76] Inventors: Edward G. Apple, Jr., 319 Oakland Dr., Wilmington, N.C. 28405; Harold B. King, 10 Island Dr., Wrightsville Beach, N.C. 28480

[21] Appl. No.: 247,448

[22] Filed: May 23, 1994

[51] Int. Cl.⁶ ............................................. G21C 19/00
[52] U.S. Cl. ..................................... 376/261; 376/262
[58] Field of Search ............... 376/260, 261, 262, 268, 376/271; 294/906

[56] References Cited

U.S. PATENT DOCUMENTS

| | | | |
|---|---|---|---|
| 4,489,037 | 12/1984 | Go | 376/261 |
| 4,697,322 | 10/1987 | Knecht et al. | 376/261 |
| 5,064,606 | 11/1991 | Go | 376/261 |

*Primary Examiner*—Daniel D. Wasil
*Attorney, Agent, or Firm*—J. E. McGinness

[57] ABSTRACT

A grapple is provided for use with a fuel bundle channel of a nuclear reactor wherein the channel is provided with a pair of gussets in opposite corners of an upper end of the channel, each gusset having a hole therein. The grapple includes a pair of lever arms, each provided with a lifting foot at a lower end of the respective lever arm. The lever arms are movable in opposite directions to a channel lifting position wherein the channel gripper of each lever arm is located under a respective one of the pair of channel gussets. The channel lifting foot of each lever arm includes a pair of laterally spaced lifting elements such that the lifting feet may engage the underside of the gusset on either side of the gusset hole. In addition, each channel lifting foot includes a secondary foot or slider captured between the pair of lifting elements. The slider includes a hole which can be aligned with the bolt hole in the gusset, permitting a ball lock pin to be inserted into the holes to thereby securely attach the lifting feet to the channel gussets.

12 Claims, 2 Drawing Sheets

GRAPPLE FOR A FUEL BUNDLE CHANNEL

TECHNICAL FIELD

This invention relates to the field of nuclear reactors in general and to a tool used to lift a nuclear reactor fuel bundle channel from a fuel bundle assembly in particular.

BACKGROUND

Typically, BWR nuclear fuel bundles and channels are delivered to reactor sites in separate shipping containers. At the sites, the fuel bundles are removed from their shipping containers, inspected, and stored hanging on racks in a fuel preparation room. Before moving the fuel bundle to the reactor, the channel is installed over the bundle.

There are occasions, however, when the channel must be removed from its associated fuel bundle. Once the channel has been installed on the fuel bundle, however, with the lower end of the channel fitted over the finger springs in the lower tie plate assembly, and with the top of the channel in place, snug against the upper tie plate, removal of the channel can be problematic. The channel is initially moved upwardly off the fuel bundle (about ten inches) so that a crane lift device can be attached to the channel. After the crane lift device has been attached, the crane hook is coupled to the lift device and the crane is then used to remove the channel from the fuel bundle. The initial upward movement of the channel currently is done manually to gain the approximate ten inches of elevation required to clear the upper tie plate. Typically, one or two people lift the channel and a third person then connects the crane lift device. If the channel is dropped during this procedure, however, the channel as well as the fuel bundle can be damaged.

There is thus a need for a device which will permit a fuel bundle channel to be removed from a fuel bundle in a simpler, more reliable and less labor intensive manner.

SUMMARY OF THE INVENTION

This invention provides a locking channel grapple which permits channel removal from a fuel bundle to be accomplished reliably and safely by one person.

The grapple device in accordance with this invention is adapted to attach to a crane lifting hook and then lowered over a fuel bundle. The grapple is designed to provide clearance so it can move down without interference over the upper tie plate bail and into position over the channel. The grapple includes screw actuated lifting feet fixed to a respective pair of lever arms. The lifting feet are positionable under the channel gussets at opposite corners of the channel. The grapple device has a central shaft to which the lever arms are pivotally mounted. The shaft is formed with screw threads at a lower end thereof, threadably receiving a cross piece pinned to the lever arms at locations between the ends of the latter. The pins are slideable within slots formed in the respective lever arms so that, when the shaft is turned by a serrated knob or handle, the lever arms are caused to swing outwardly moving the lifting feet under the channel gussets. The lifting feet on each lever arm are forked so that spaced lifting elements will fit around the upper tie plate boss or bosses on which the channel gussets rest, and which is formed with a threaded hole for receiving a bolt passing through the channel gusset. The screw action of the lever arms effectively holds the lifting feet under the channel gussets, preventing from slipping from under the channel gusset(s) during lifting.

The lifting feet on each lever arm also have a secondary foot or slider which is captured in a slot between the spaced lifting elements, permitting the movable secondary foot to be located centrally under a respective channel gusset as described below. The secondary foot, unlike the forked lifting feet, has a hole in its end which, after the channel is lifted away from the tie plate boss, can be aligned with the bolt hole in the channel gusset by sliding the secondary foot to its extreme outside position. A pair of conventional ball lock pins are attached to the grapple device by chains or cables so they will be readily available for use with the sliders described above. Specifically, after the hole in the secondary foot of each pair of lifting feet is aligned under a respective channel gusset hole, the ball lock pin is inserted through the channel gusset hole and through the hole in the secondary foot, further insuring against relative lateral movement between the channel and the grapple. The ball lock pin will safely secure the channel to the grapple until the channel is securely back in its storage place, or until it is re-mounted on the fuel bundle.

In its broader aspects, therefore, the present invention relates to a grapple for use with a fuel bundle channel of a nuclear reactor wherein the channel is provided with a pair of gussets in opposite diagonal corners of an upper end of the channel, each gusset having a hole therein, the grapple comprising a pair of lever arms, each provided with a channel lifting foot at a lower end of the respective lever arm, the lever arms movable to a channel lifting position wherein the channel lifting foot of each lever arm is located under a respective one of the pair of channel gussets, and wherein each lifting foot includes a pair of laterally spaced lifting elements such that the lifting foot may engage the underside of the gusset on either side of the gusset hole.

Additional objects and advantages of the invention will become apparent from the detailed description which follows.

BEST MODE FOR CARRYING OUT THE INVENTION

Figure 1:
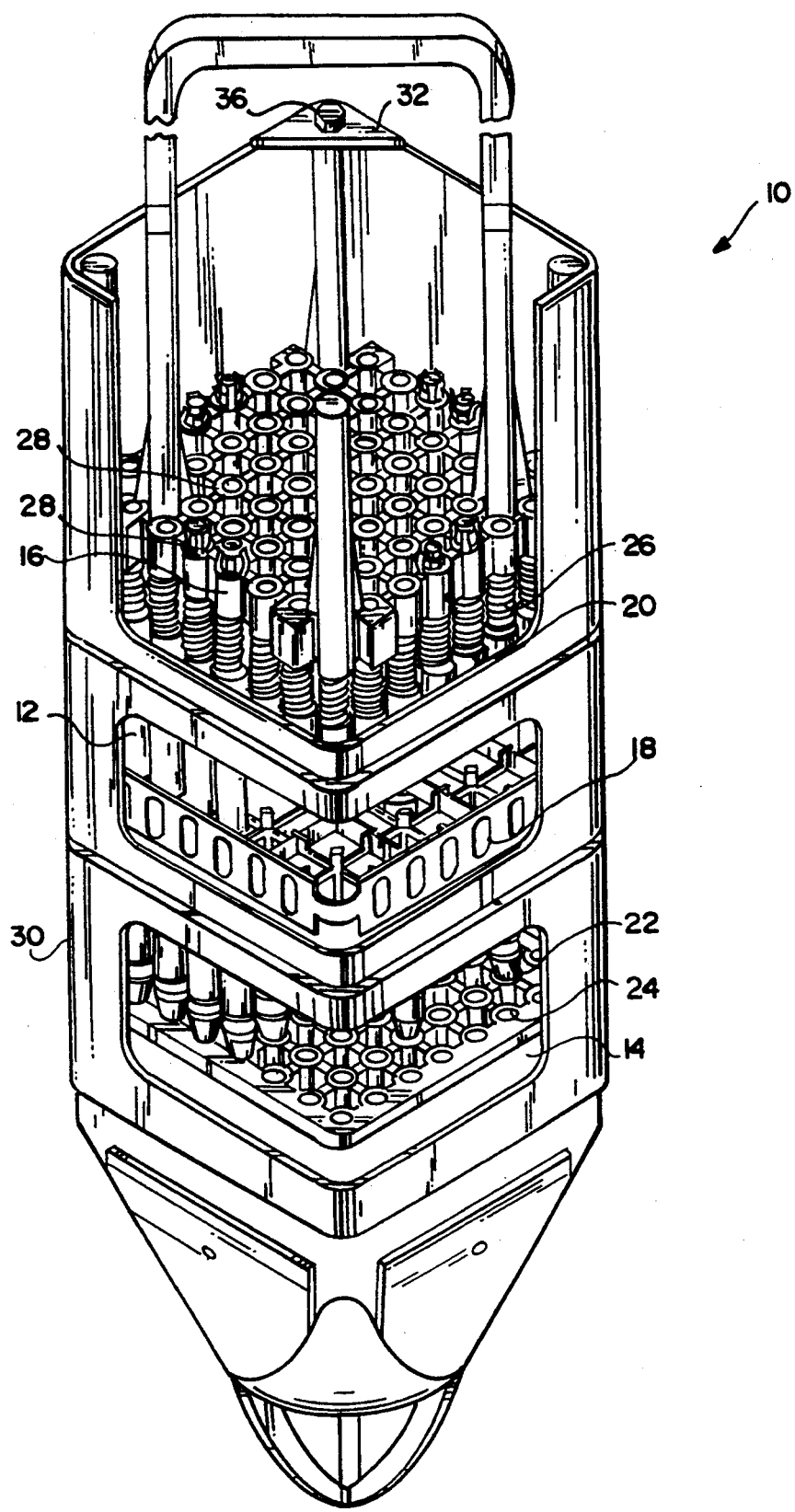
FIG. 1 is a perspective view of a convention fuel bundle assembly for a boiling water nuclear reactor.

As illustrated in FIG. 1, a conventional fuel assembly 10 includes a plurality of elongated fuel rods 12 supported between a lower tie plate 14 and an upper tie plate 16. Fuel rods 12 pass through a plurality of fuel rod spacers 18 which provide intermediate support to retain the elongated rods in spaced relation and to restrain them from lateral vibration.

Each fuel rod 12 comprises an elongated tube containing the fissile fuel (such as uranium or plutonium dioxide) in the form of pellets, particles, powder or the like, sealed in the tube by upper and lower end plugs 20 and 22. Lower end plugs 22 are formed with a taper for registration and support in support cavities 24 formed in lower tie plate 14. Upper end plugs 20 are formed with extensions 26 which register with support cavities 28 in upper tie plate 16.

Several of the support cavities 24 (for example, selected ones of the edge or peripheral cavities) in lower tie plate 14 are formed with threads to receive fuel rods having threaded lower end plugs 22. Extensions 26 of upper end plugs 20 of these same fuel rods are elongated to pass through the cavities in upper tie plate 16 and are formed with threads to receive internally threaded retaining nuts 28. In this manner the upper and lower tie plates and the fuel rods are formed into a unitary structure.

Fuel assembly 10 further includes a thin-walled tubular flow channel 30 of substantially square cross section, adapted to provide a sliding fit over lower and upper tie plates 14 and 16 and spacers 18 so that it may be mounted on and removed from the fuel rod bundle. Channel 30 has a pair of diagonally opposed tabs 32, 34 (only tab 32 shown in FIG. 1) welded to its top end which provides for fastening the channel to the fuel bundle with bolts 36.

Figure 3:
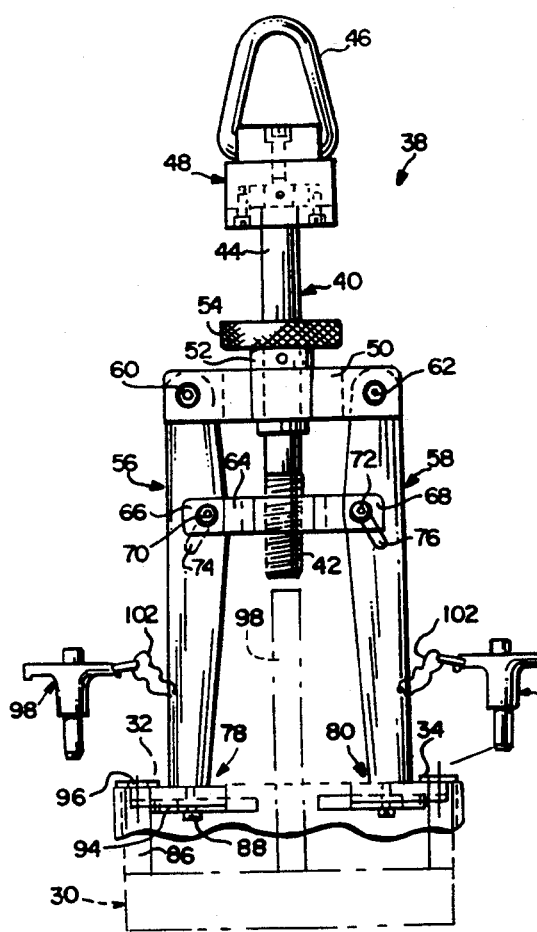
FIG. 3 is a side elevation similar to FIG. 2 but with lever arms of the grapple moved to a channel lifting position.
Figure 2:
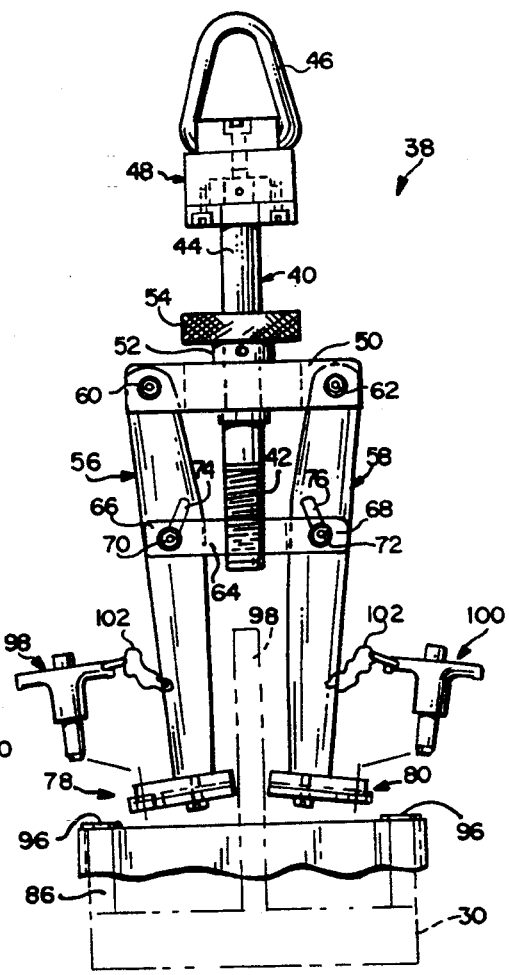
FIG. 2 is a side elevation of a grapple in accordance with this invention, for use with a fuel bundle assembly of the type shown in FIG. 1.
Figure 4:
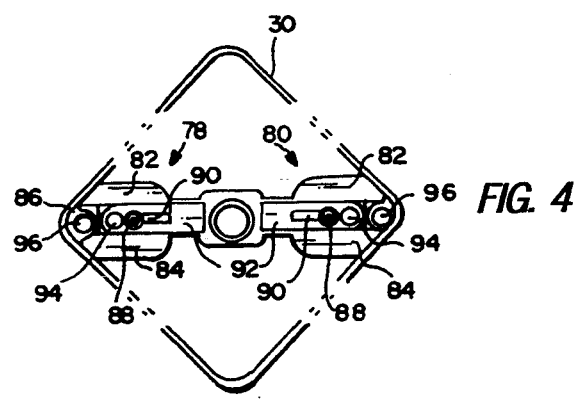
FIG. 4 is a bottom plan view of FIG. 3.

With this background, attention is directed to FIGS. 2-4 which illustrate a locking channel grapple 38 in accordance with this invention. The grapple 38 includes a central screw actuator shaft 40 having a lower threaded end 42 and an upper, opposite end 44 which is provided with an eye 46 for attachment to a crane hook (not shown). The eye 46 is part of a conventional swivel coupling 48 which permits the grapple 38 to rotate about an axis passing through the shaft 40.

Approximately mid-way of the shaft 40, a fixed cross piece 50 is secured thereto. It will be appreciated that cross piece 50 is mounted via bushing 52 so as to be non-rotatable relative to the shaft 40 and in an axially fixed position. Shaft 40, however, is rotatable relative to the cross piece 50 by means of a knurled or serrated knob 54 permits the shaft to be rotated by the user as described in greater detail below.

A pair of identical (mirror image) lever arms 56, 58 are pivotally secured to the cross piece 50 via pins 60, 62 and extend downwardly beyond the lower threaded end 42 of the shaft 40. The lever arms are also connected to a movable cross piece 64 which is threadably received on the lower threaded end 42 of the shaft 40. Outer opposite ends 66, 68 of the movable cross piece 64 are provided with cam pins 70, 72 which are slideable within elongated slots 74, 76, respectively, formed in lever arms 56 and 58, between the respective ends thereof. By this arrangement, it will be appreciated that the lever arms 56 and 58 may be swung radially outwardly or inwardly by rotating the shaft 40 in the appropriate direction. For example, rotation of the shaft 40 in one direction causes the movable cross piece 64 to rise on the shaft 40 which, in turn, causes lever arms 56, 58 to swing outwardly about pins 60, 62 as the cam pins 70, 72 ride in slots 74, 76. This action may be appreciated from the relative positions of the grapple components shown in FIGS. 2 and 3. Rotation of the shaft 40 in the opposite direction similarly causes movement of the cross piece 64 and lever arms 56 and 58 in opposite directions.

At the remote ends of lever arms 56 and 58 are secured channel lifting assemblies or feet 78, 80, respectively. Because the lifting assemblies are essentially identical, only assembly 78 will be described in detail, and reference numerals used in the following description of assembly 78 apply to assembly 80 as well.

With reference also to FIG. 4, the channel lifting foot 78 is welded or otherwise fixedly secured to the lower end of lever arm 56, and is forked to provide laterally spaced lifting elements 82, 84 extending radially away from the grapple lever arm 58. These lifting elements 82, 84 are sized and shaped to fit around the upper tie plate boss 86, beneath the gusset or tab 32.

A screw or bolt 88 extends downwardly from the lifting foot 78, in the space between the lifting elements 82, 84. The screw or bolt 88 extends through an elongated slot 90 formed in a slider 92 which is free to reciprocate within the space or groove between the lifting elements 82, 84. Because the bolt head is wider than the slot 90, the bolt 88 captures or retains the slider 92 within the space between the lifting elements 82, 84. The forward (or radially outer) end of the slider 92 is formed with a hole 94 of approximately the same diameter as the bolt hole 96 formed in the gusset 32. It will be appreciated that the hole 94 may be aligned with the bolt hole 96 as described in detail below.

In use, the locking channel grapple 38 in accordance with this invention permits the channel 30 to be removed from the fuel bundle assembly in a safe manner and by only one person. With the grapple 38 secured to the hook of a crane (not shown) via eye 46, the grapple 38 is lowered over a fuel bundle surrounded by a channel 30 to be removed. In this regard, it will be appreciated from FIGS. 2 and 3 that the grapple 38 is designed to provide clearance so that it can move down over and on either side of the upper tie plate bail, shown in phantom at 98 in FIGS. 2 and 3. As a result, the grapple 38 with its lever arms 56 and 58 in the position illustrated in FIG. 2, can be moved downwardly until the channel lifting assemblies 78 and 80 are located below the channel gussets 32, 34. By then rotating the knob 54 in a clockwise direction, the movable cross piece 64 will move upwardly on the shaft 40 and, as cross piece 64 moves upwardly, lever arms 56 and 58 are caused to swing radially outwardly about the pins 60 and 62 as the cam pins 70, 72 ride within respective elongated slots 74, 76. The slots 74 and 76 are formed with a length such that when the cam pins 70, 72 reach the ends of the slots, the lifting elements 82, 84 (and similar lifting elements associated with foot 80) at the lower end of each of the lever arms 56, 58 will be located under the channel gussets 32, 34 as shown in FIGS. 3 and 4.

The screw action of the lever arms 56, 58 holds the lifting elements 86, 88 under the channel gussets 32, 34, preventing lateral slippage.

The channel 30 can now be lifted upwardly with the aid of the crane (not shown), until the channel gussets 32, 34 clear the top of the upper tie plate, at least to the extent that the sliders 92 are able to move radially outwardly until holes 94 are aligned with the bolt holes 96 in the gussets 32, 34. This radial outward movement of the sliders 92 may be accomplished by one person who can move the sliders to their extreme outside position where the outermost end of the slider engages the inner wall of the channel. In other words, alignment of the holes 94 within the sliders 92 and the holes 96 in the gussets 32 and 34 is easily accomplished simply by moving the sliders 92 to their radially outermost position. It should also be noted here that the outward movement of the sliders 92 is accommodated by reason of the elongated slots 90 through which the retaining screws or bolts 88 extend.

After the holes 94 and sliders 92 are aligned with holes 96 in the gussets 32, 34, conventional ball lock pins 98, 100 are inserted through the channel gusset holes 96 and through the holes 94 in the sliders 92. The ball lock pins 98, 100 insure that the lifting feet 78, 80 will not move laterally out of engagement with the gussets 32, 34.

With further reference to FIGS. 2 and 3, these conventional ball lock pins 98, 100 may be held in loose association with the lever arms 58 and 60 by chains or cables 102 or other suitable means.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A grapple for use with a fuel bundle channel of a nuclear reactor wherein the channel is provided with a pair of gussets in opposite diagonal corners of an upper end of the channel, each gusset having a hole therein, the grapple comprising:

a pair of lever arms, each provided with a channel lifting foot at a lower end of the respective lever arm, said lever arms movable in opposite directions to a channel lifting position wherein said lifting foot of each lever arm is located under a respective one of the pair of channel gussets, and wherein the lifting foot of each lever arm is provided with a pair of laterally spaced lifting elements such that said lifting foot may engage the underside of the gusset on either side of the gusset hole.

2. The grapple of claim 1 wherein means are provided for moving said lever arms between said channel lifting position and a non-operative position permitting said lifting feet to be moved into and out of the channel by means of a lifting device.

3. The grapple of claim 1 wherein a slider is located between said pair of lifting elements of each channel lifting foot, said slider having a hole at one end thereof, and said slider movable relative to said lifting elements to permit said hole to be aligned with the hole in the channel gusset.

4. The grapple of claim 1 and including a shaft having an upper end and a threaded lower end; a fixed cross piece on said shaft; and wherein said lever arms are pivotally secured to opposite ends of said fixed cross piece.

5. The grapple of claim 4 wherein a second, movable cross piece is threadably secured to the threaded lower end of the shaft, said movable cross piece having cam pins fixed thereto at opposite ends of said movable cross piece, said cam pins slidably received within slots formed in said lever arms.

6. The grapple of claim 5 wherein a knob is fixed to said shaft to enable rotation of said shaft relative to said fixed cross piece and said movable cross piece, thereby causing said movable cross piece to move axially along said shaft.

7. The grapple of claim 3 and including a shaft having an upper end and a threaded lower end; a fixed cross piece on said shaft; and wherein said lever arms are pivotally secured to opposite ends of said fixed cross piece.

8. The grapple of claim 7 wherein a second, movable cross piece is threadably secured to the threaded lower end of the shaft, said movable cross piece having cam pins fixed thereto at opposite ends of said movable cross piece, said cam pins slidably received within slots formed in said lever arms.

9. The grapple of claim 8 wherein a knob is fixed to said shaft to enable rotation of said shaft relative to said fixed cross piece and said movable cross piece, thereby causing said movable cross piece to move axially along said shaft.

10. The grapple of claim 4 and including a swivel coupling mounted on the upper end of said shaft for attaching the grapple to a lifting device.

11. The grapple of claim 3 and including means for securing each of said sliders to a respective one of said gussets.

12. The grapple of claim 11 wherein said means comprises a ball lock pin insertable into said aligned holes.

* * * * *